(12) United States Patent
Blauvelt (10) Patent No.: US 7,945,166 B2
(45) Date of Patent: May 17, 2011

(54) INDEPENDENT UPSTREAM/DOWNSTREAM BANDWIDTH ALLOCATIONS IN A COMMON HYBRID TELECOMMUNICATIONS NETWORK

(75) Inventor: Henry A. Blauvelt, San Marino, CA (US)

(73) Assignee: HOYA Corporation USA, San Jose, CA (US)

( * ) Notice: Subject to any disclaimer, the term of this patent is extended or adjusted under 35 U.S.C. 154(b) by 720 days.

(21) Appl. No.: 11/952,275

(22) Filed: Dec. 7, 2007

(65) Prior Publication Data

US 2008/0310838 A1  Dec. 18, 2008

Related U.S. Application Data

(60) Provisional application No. 60/871,133, filed on Dec. 20, 2006.

(51) Int. Cl.
*H04B 10/00* (2006.01)

(52) U.S. Cl. ........ 398/115; 398/116; 398/128; 398/135; 398/41; 398/43; 398/67; 398/68; 398/72; 385/88; 385/89; 385/90; 385/92; 385/93; 725/105; 725/106; 725/125; 725/127; 725/129; 370/310; 370/338; 370/277; 370/328; 455/422; 455/422.1

(58) Field of Classification Search .............. 398/66, 398/67, 68, 69, 70, 71, 72, 79, 98, 99, 100, 398/135, 136, 137, 138, 139, 164, 182, 183, 398/202, 208, 128, 130, 59, 83, 115, 116, 398/117, 41, 43, 42; 385/89, 90, 92, 93, 385/88; 725/105, 106, 125, 127, 129; 370/351, 389, 468, 392, 465, 390, 310, 338, 277, 328, 329, 339; 455/422, 422.1
See application file for complete search history.

(56) References Cited

U.S. PATENT DOCUMENTS

| 5,528,582 A | 6/1996 | Bodeep et al. |
| 7,146,630 B2 | 12/2006 | Dravida et al. |
| 7,616,890 B2 * | 11/2009 | Orbach et al. ............... 398/67 |
| 2005/0175035 A1 | 8/2005 | Neely et al. |
| 2006/0133810 A1 * | 6/2006 | Inbar et al. ............... 398/70 |
| 2006/0256799 A1 | 11/2006 | Eng |

OTHER PUBLICATIONS

International Search Report and Written Opinion for PCT App. No. PCT/US2007/087832.

\* cited by examiner

*Primary Examiner* — Hanh Phan
(74) *Attorney, Agent, or Firm* — David S. Alavi (57) ABSTRACT

A network interface apparatus comprises a bidirectional optical signal port, an optical diplexer connected to the bidirectional optical signal port, a first RF signal port (bidirectional), a second RF signal port, a first RF diplexer, and an RF splitter. The RF diplexer transmits a first received RF input signal from the first RF signal port to the optical diplexer to modulate an optical output signal transmitted by the optical diplexer to the optical signal port. The RF splitter receives from the optical diplexer an RF signal derived from an RF-modulated optical input signal received from the bidirectional optical signal port, transmits a first portion of the derived RF signal as a first RF output signal to the first RF signal port through the first RF diplexer, and transmits a second portion of the derived RF signal as a second RF output signal to the second RF signal port.

26 Claims, 8 Drawing Sheets

INDEPENDENT UPSTREAM/DOWNSTREAM BANDWIDTH ALLOCATIONS IN A COMMON HYBRID TELECOMMUNICATIONS NETWORK

BENEFIT CLAIMS TO RELATED APPLICATIONS

This application claims benefit of U.S. provisional App. No. 60/871,133 filed Dec. 20, 2006 in the name of Henry A. Blauvelt, said provisional application being hereby incorporated by reference as if fully set forth herein.

BACKGROUND

The field of the present invention relates to a telecommunications network. In particular, multiple upstream/downstream bandwidth allocations on a common hybrid (i.e. electrical and optical) telecommunications network are described herein.

Many telecommunications networks (carrying voice, data, video, or other information) include both optical network pathways and electrical network pathways, i.e., such networks are hybrid networks. Signals in the electrical portions of the network typically comprise radio-frequency (RF) electrical waveforms encoding the transmitted information, while signals in the optical portions of the network typically comprise propagating optical power modulated according to the RF amplitude of the equivalent RF electrical waveform. Both optical and electrical portions of a hybrid telecommunications network typically carry signals in either direction; such a network is bidirectional. A transition between optical and electrical network portions typically occurs at a network interface unit (NIU), wherein "upstream" signals received from the electrical portion of the network are converted to optical signals and transmitted to the optical portion of the network and "downstream" signals received from the optical portion of the network are converted to electrical signals and transmitted to the electrical portion of the network. The designations of "upstream" and "downstream" have become common usage and are used herein for convenience of description, however, these terms are not intended to be limiting and could in fact be replaced with "one direction" and "the other direction" or similarly generic terminology without altering the scope of the present disclosure or appended claims.

In telecommunications networks employing bidirectional electrical signal transmission in a common cable, electrical signal bandwidth typically is allocated into non-overlapping "upstream" and "downstream" RF frequency ranges, often with a "crossover" RF band separating them in which no signals are transmitted in either direction (designated "x-freq" in the drawings). By thus separating the upstream and downstream bandwidth allocations, interference between upstream and downstream signals is substantially avoided. Such interference is of particular concern in electrical portions of the hybrid network due to signal reflections at various components of the electrical portion of the network. Interference between upstream and downstream electrical signals can result in distortion of the signals to an unacceptable extent. In optical portions of the hybrid network, overlapping upstream and downstream RF frequency ranges are less of a concern, since signal reflections typically can be suppressed to a greater degree in the optical portion of the network than in the electrical portion. In addition, differing optical carrier wavelengths can be employed for the upstream and downstream optical signals, with wavelength-selective optical components substantially eliminating interference between the upstream and downstream signals.

Figure 1:
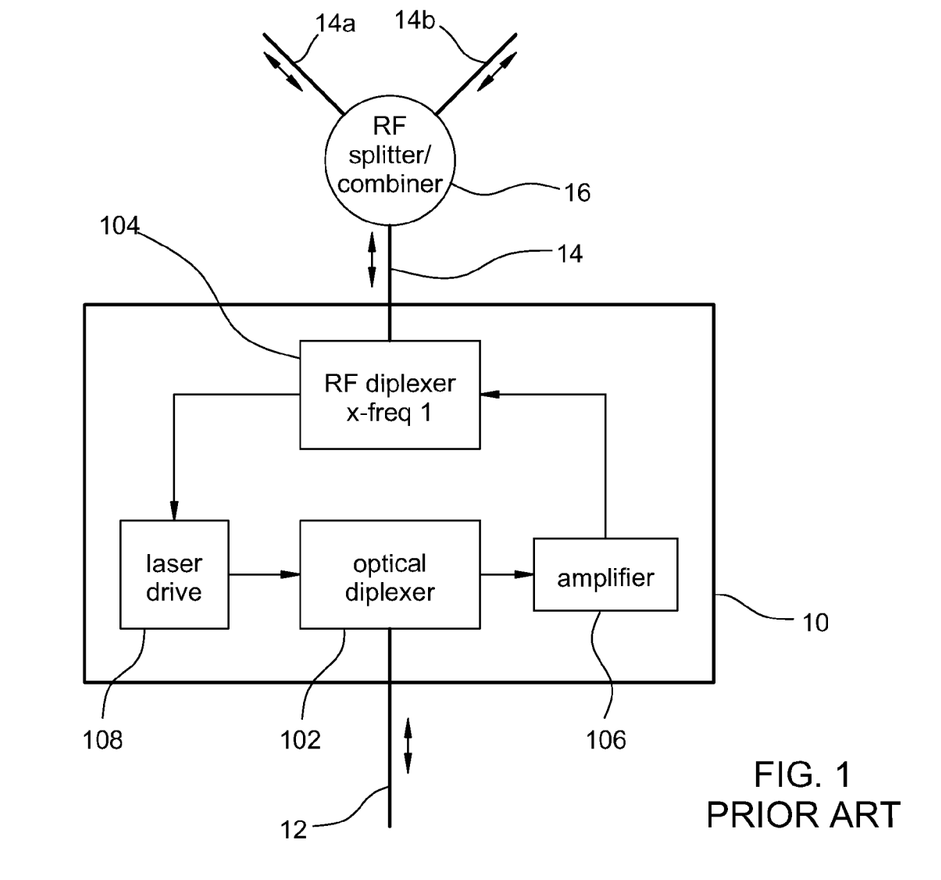
FIG. 1 illustrates schematically a prior art network interface unit.

FIG. 1 illustrates schematically a prior-art network interface unit (NIU). NIU 10 comprises an optical diplexer 102 and a radio-frequency (RF) diplexer 104. An optical fiber 12 serves as a bidirectional optical signal port and is connected to the optical diplexer 102. A cable 14 (e.g., coaxial cable) serves as a bidirectional RF signal port and is connected to the RF diplexer 104. The RF diplexer is configured and connected (i) to receive from the optical diplexer 102 an RF signal derived from an RF-modulated optical signal received from optical fiber 12 and (ii) to transmit the derived RF signal to the cable 14. The RF diplexer is also configured and connected (i) to receive from the cable 14 an RF signal and (ii) to transmit the received RF signal to modulate an optical signal transmitted by the optical diplexer to the optical fiber 12. The prior art NIU 10 can further comprise an RF amplifier 106 configured and connected to amplify the derived RF signal, or can further comprise a laser drive circuit 108 configured and connected to modulate a laser drive signal with the received RF signal to modulate the transmitted optical signal. An RF splitter 16 connects cables 14, 14a, and 14b, each of which can carry bidirectional RF signals.

Bidirectional RF signals are not transmitted at overlapping RF frequencies due to unacceptable levels of interference typically encountered. RF input signals are received into NIU 10 through cable 14 only within an input RF frequency range (often referred to as the "upstream" RF band), while RF signals are transmitted from NIU 10 through cable 14 only within an output RF frequency range (often referred to as the "downstream" RF band). The input and output RF frequency bands are non-overlapping, and are often separated by a range of RF frequencies that are used neither for receiving nor for transmitting RF signals to/from NIU 10 (referred to herein as the crossover range or band, or "x-freq" in the drawings). In this way interference between input and output RF signals (i.e. upstream and downstream RF signals) can be avoided. Standard RF frequency band allocations in current use are about 5-42 MHz for the "upstream" RF band (also referred to as the "CATV return band") and about 54-870 MHz for the "downstream" RF band (with the crossover band being about 42-54 MHz). Other RF frequency ranges can be used. The observed asymmetry in bandwidth allocation between the standard upstream and downstream RF frequency bands has arisen due to historically greater demand for downstream transmission bandwidth versus upstream transmission bandwidth.

SUMMARY

A network interface apparatus comprises (a) a bidirectional optical signal port, (b) an optical diplexer connected to the bidirectional optical signal port, (c) a first RF signal port (bidirectional), (d) a second RF signal port, (e) a first RF diplexer, and (f) an RF splitter. The RF diplexer is configured and connected to transmit a first received RF input signal from the first RF signal port to the optical diplexer to modulate an optical output signal transmitted by the optical diplexer to the optical signal port. The RF splitter is configured and connected (i) to receive from the optical diplexer an RF signal derived from an RF-modulated optical input signal received from the bidirectional optical signal port, (ii) to transmit a first portion of the derived RF signal as a first RF output signal to the first RF signal port through the first RF diplexer, and (iii) to transmit a second portion of the derived RF signal as a second RF output signal to the second RF signal port.

A method comprises (a) receiving into an RF splitter from an optical diplexer a derived RF signal, (b) transmitting from the RF splitter first and second portions of the derived RF signal to corresponding first and second RF signal ports as corresponding first and second RF output signals, (c) receiving a first RF input signal from the first RF signal port (bidirectional) through a first RF diplexer, and (d) transmitting the first received RF input signal to the optical diplexer to modulate an optical output signal transmitted by the optical diplexer to the optical signal port. The derived RF signal is derived from an RF-modulated optical signal received by the optical diplexer from a bidirectional optical signal port. The first portion of the derived RF signal is transmitted to the first RF signal port through the first RF diplexer.

Objects and advantages pertaining to hybrid networks and network interface units may become apparent upon referring to the exemplary embodiments illustrated in the drawings and disclosed in the following written description and/or claims.

DETAILED DESCRIPTION OF EMBODIMENTS

Figure 2:
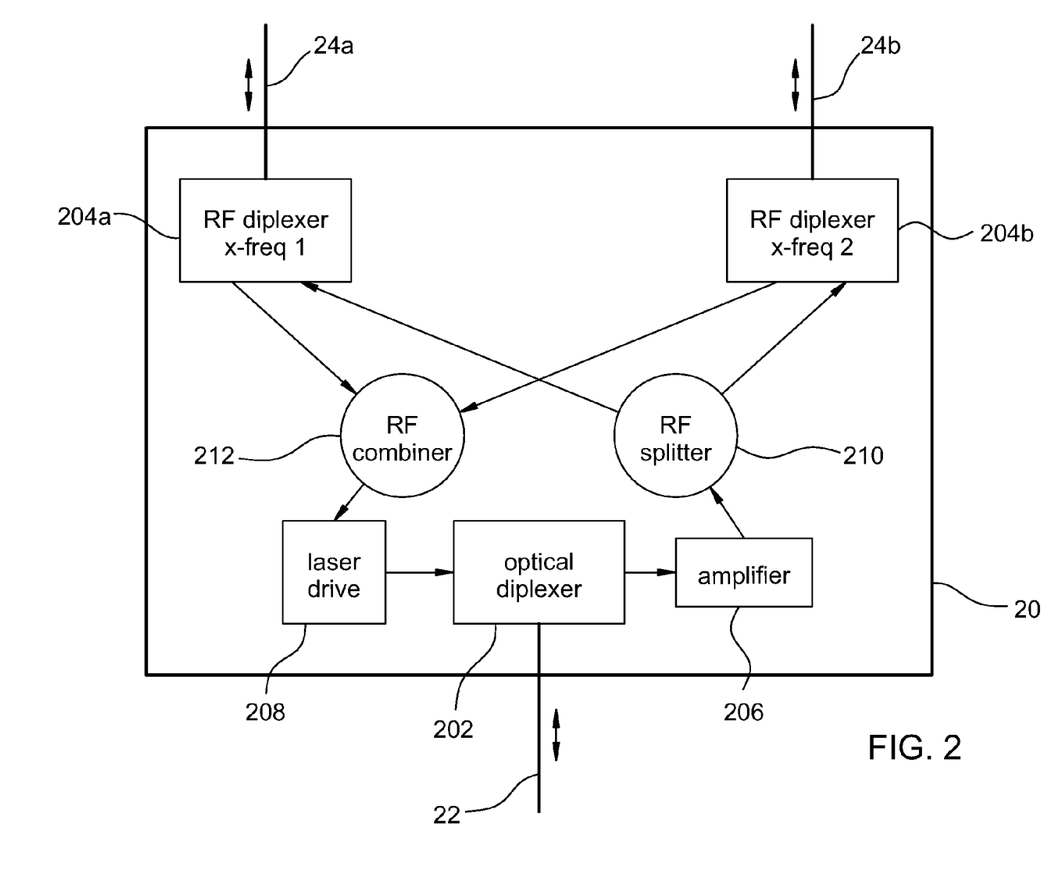
FIG. 2 illustrates schematically an exemplary network interface unit.

An exemplary embodiment of a network interface unit (NIU) 20 is illustrated schematically in FIG. 2. The NIU 20 comprises: (a) a bidirectional optical signal port 22; (b) an optical diplexer 202 connected to the bidirectional optical signal port 22; (c) a first bidirectional radio frequency (RF) signal port 24a; (d) a first RF diplexer 204a connected to the first bidirectional RF signal port 24a; (e) a second bidirectional RF signal port 24b; (f) a second RF diplexer 204b connected to the second bidirectional RF signal port 24b; (g) an RF splitter 210; and (h) an RF combiner 212. RF splitter 210 is configured and connected (i) to receive from the optical diplexer 202 an RF signal derived from an RF-modulated optical signal received from the bidirectional optical signal port 22 and (ii) to transmit corresponding first and second portions of the derived RF signal to each of the first and second bidirectional RF signal ports 24a/24b through the corresponding first and second RF diplexers 204a/204b. The RF combiner is configured and connected (i) to receive from each of the first and second bidirectional RF signal ports 24a/24b through the corresponding first and second RF diplexers 204a/204b corresponding first and second RF signals and (ii) to transmit the combined first and second received RF signals to modulate an optical signal transmitted by the optical diplexer 202 to the optical signal port 22.

The bidirectional optical signal port 22 can comprise an optical fiber. Alternatively, the bidirectional optical signal port 22 can comprise a planar optical waveguide, free-space optical component, or any other components suitable for conveying optical signals to and from the optical diplexer 202. The bidirectional RF signal ports 24a/24b can comprise electrical cables, wires, or connectors of any suitable type for transmitting RF signals, including but not limited to coaxial cables or connectors.

An exemplary method comprises: (a) receiving into the RF splitter 210 from the optical diplexer 202 an RF signal derived from an RF-modulated optical signal received by the optical diplexer 202 from the bidirectional optical signal port 22; (b) transmitting from the splitter 210 corresponding portions of the derived RF signal to each of the bidirectional RF signal ports 24a/24b through the corresponding RF diplexers 204a/204b; (c) receiving into the RF combiner 212 corresponding RF signals from each of the bidirectional RF signal ports 24a/24b through the corresponding RF diplexers 204a/204b; and (d) transmitting the combined received RF signals to modulate an optical signal transmitted by the optical diplexer 202 to the optical signal port 22.

NIU 20 can further comprise an RF amplifier 206 configured and connected to amplify the derived RF signal before it is received by the splitter 210. The RF amplifier 206 can be of any suitable type or can include any needed or desired circuitry or elements. NIU 20 can further comprise a laser drive circuit 208 configured and connected to modulate a laser drive signal with the combined first and second RF signals to modulate the transmitted optical signal. Laser drive circuit 208 can be of any suitable type; examples can include a resistor or resistor network, a resistor and transformer network, an RF amplifier, or any other circuitry or elements suitable for coupling an RF signal to modulate the laser output of optical diplexer 202. The optical diplexer 202 can be configured to receive input optical signals and to transmit output optical signals of the same wavelength. Alternatively, the optical diplexer can be configured to receive optical signals differing in wavelength from optical signals it transmits, thereby substantially avoiding potential interference between input and output optical signals.

The first RF diplexer 204a is configured so that (i) RF signals are received into the RF combiner 212 from the first bidirectional RF signal port 24a through the first RF diplexer 204a only in a first input RF frequency range and (ii) RF signals are transmitted from the splitter 210 to the first bidirectional RF signal port 24a through the first RF diplexer 204a only in a first output RF frequency range. The first input and output RF frequency ranges are substantially non-overlapping. The second RF diplexer 204b is configured so that (i) RF signals are received into the RF combiner 212 from the second bidirectional RF signal port 24b through the second RF diplexer 204b only in a second input RF frequency range and (ii) RF signals are transmitted from the splitter 210 to the second bidirectional RF signal port 24b through the second RF diplexer 204b only in a second output RF frequency range. The second input and output RF frequency ranges are substantially non-overlapping. Non-overlapping input and output RF frequency ranges are employed for each bidirectional RF signal port to reduce or substantially avoid interference between input and output RF signals, and correspond to upstream and downstream bandwidth allocations for each of the bidirectional RF signal ports 24a/24b.

In the prior art NIU 10 of FIG. 1, RF signals carried on both of the cables 14a/14b are characterized by the same upstream/downstream bandwidth allocation imposed by the RF diplexer 104. In the exemplary NIU 20 of FIG. 2, the first input RF frequency range differs from the second input RF frequency range, or the first output RF frequency range differs from the second output RF frequency range. In this way differing upstream/downstream bandwidth allocations can be implemented for the bidirectional RF signal ports 24a/24b, since those bandwidth allocations are imposed independently by the corresponding RF diplexers 204a/204b. Any desired bandwidth allocation can be implemented independently for each bidirectional RF signal port, subject only to constraints that might be imposed by any networks or devices connected to the RF ports.

In an exemplary embodiment of the NIU 20, the first output RF frequency range can at least partly overlap the second input RF frequency range or the second output RF frequency range can at least partly overlap the first input RF frequency range. In another exemplary embodiment of NIU 20, the first input RF frequency range is lower than the first output RF frequency range, the second input RF frequency range is lower than the second output RF frequency range, and the first output RF frequency range overlaps the second input RF frequency range.

The NIUs disclosed herein can be employed in any hybrid telecommunications network, including active or passive networks of any suitable topology carrying signals of any suitable type. An NIU configured substantially as shown in FIG. 2 can be advantageously utilized, for example, in current CATV hybrid networks carrying both cable TV signals and also digital data signals. In a typical CATV hybrid network, the output RF frequency range (i.e. the downstream bandwidth) currently is about 54-870 MHz (or sometimes higher on the upper end of the range), while the input RF frequency range (i.e. the upstream bandwidth, typically referred to as the "CATV return band") currently is limited to about 5-42 MHz. The output RF frequency range typically is segregated into a broadcast video portion (about 54-550 MHz) and an additional portion (about 550 MHz-870 MHz or higher) used for other purposes, e.g., digital data transmission, with devices (televisions, set-top boxes, computer modems, and so on) connected to the cables 14a/14b being receptive to the appropriate RF frequency range. It should be noted that the upper limit of the "CATV return band" is expected to be increased in the coming years to about 65-85 MHz or more. The term "CATV return band" as used herein shall be construed as whatever standard CATV return band is applicable at a given point in time.

In the exemplary embodiment of FIG. 2, NIU 20 can have differing bandwidth allocations on the two bidirectional RF signal ports 24a/24b. For example, the first input RF frequency range can be about 5 to about 42 MHz (the current CATV return band) and the first output RF frequency range can be about 54 MH to about 870 MHz or more (with the crossover range of the first diplexer 204a being about 42-54 MHz). The first bidirectional RF signal port 24a would thereby have an upstream/downstream bandwidth allocation compatible with many current CATV hybrid networks, and might be connected to devices not needing large upstream bandwidth or requiring large downstream bandwidth. The second input RF frequency range can extend from about 5 MHz to any selected second crossover RF frequency between about 54 MHz and about 550 MHz (therefore extending beyond the current CATV return band), while the second output frequency range can extend from the selected crossover frequency to about 870 MHz or more. An RF frequency interval around the selected crossover frequency would not be used for either input or output RF signals and would constitute the RF crossover range of the second diplexer 204b. Devices that can benefit from increased upstream bandwidth can be connected to the second bidirectional RF signal port 24b. More generally, the first input RF frequency range can be chosen to fall within the applicable CATV return band at a given point in time, while the second output RF frequency range can be chosen to extend beyond that applicable CATV return band. The ability to allocate upstream and downstream bandwidth differently among NIUs or within a single NIU enables appropriate bandwidth allocation for different users. For example, a commercial entity might have greater need for upstream data transmission bandwidth, while a typical residential user might desire more downstream bandwidth for receiving video transmissions.

These frequency ranges represent only a few examples of an exemplary implementations of NIU 20. Any other set of input and output frequency ranges can be employed while remaining within the scope of the present disclosure or appended claims. In addition, the exemplary NIU 20 of FIG. 2 is shown having only two bidirectional RF signal ports 24a/24b and two corresponding RF diplexers 204a/240b. Other embodiments can be implemented having any desired number of bidirectional RF signal ports and corresponding RF diplexers while remaining within the scope of the present disclosure or appended claims (three bidirectional RF signal ports 24a/24b/24c and three corresponding RF diplexers 204a/204b/204c shown in the exemplary embodiment of FIG. 3). In such an embodiment, the splitter 210 would require a corresponding number of outputs while the combiner 212 would require a corresponding number of inputs. In such multi-port embodiments, each bidirectional RF signal ports can be provided with its own upstream/downstream bandwidth allocation by a corresponding appropriately configured RF diplexer.

Figure 6:
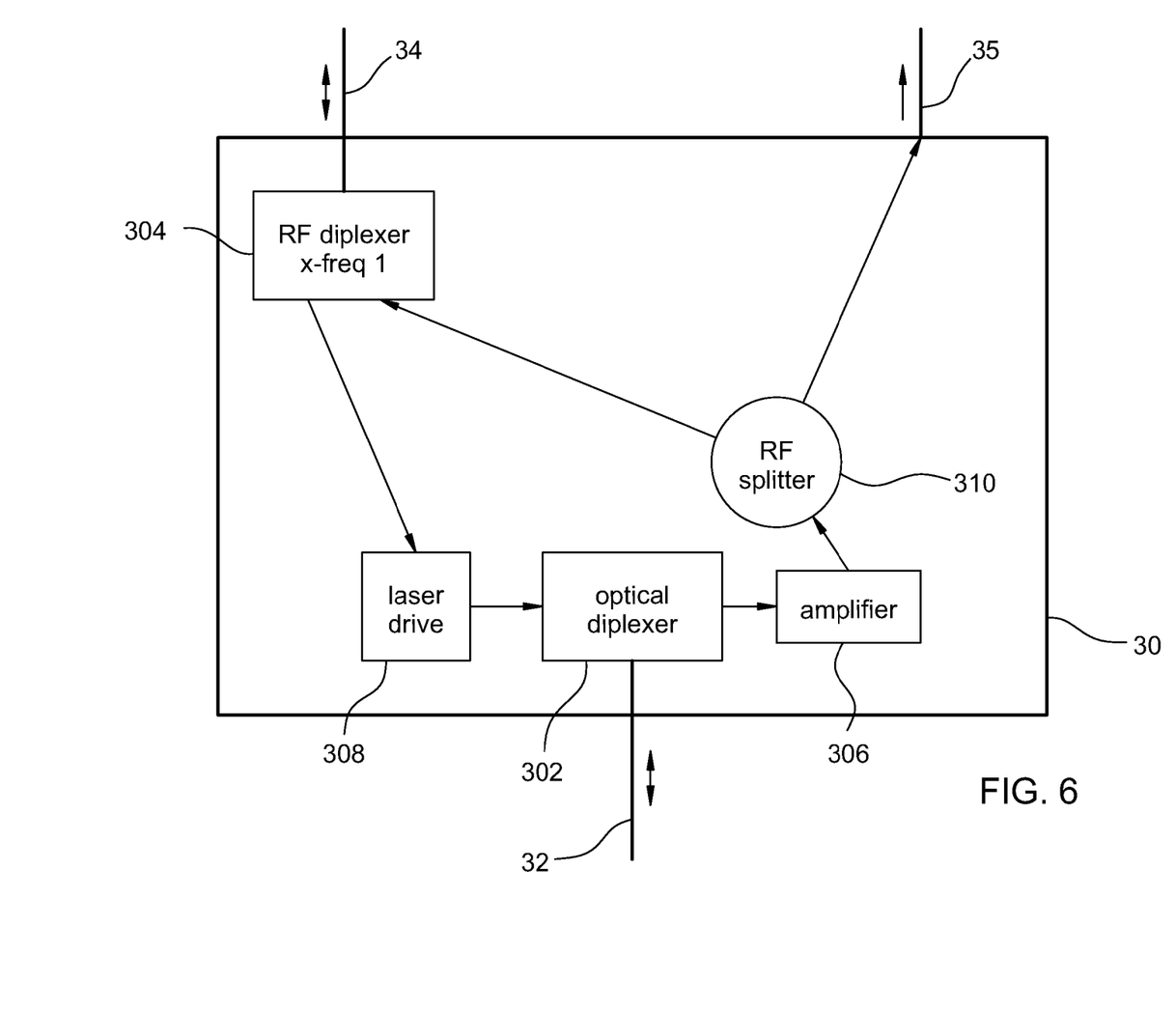
FIG. 6 illustrates schematically another exemplary network interface unit.
Figure 7:
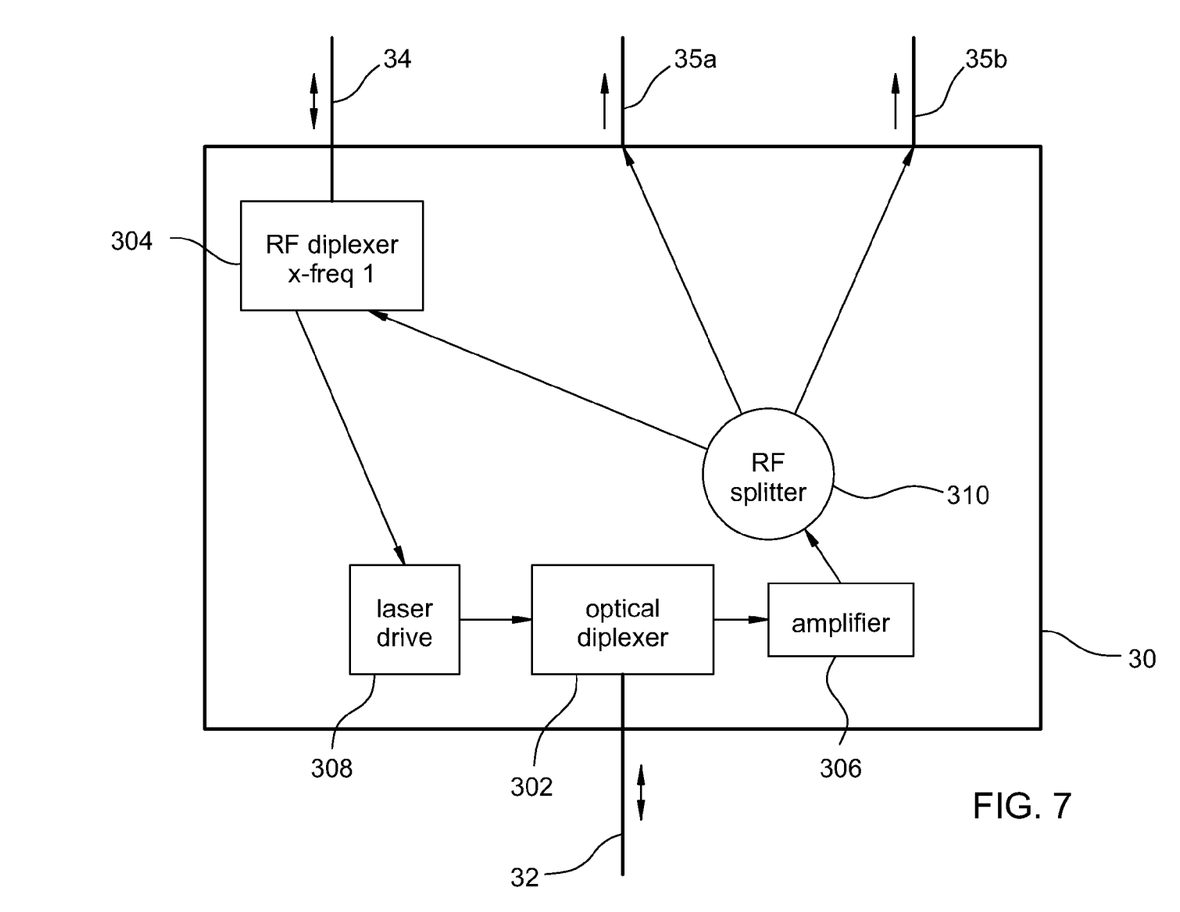
FIG. 7 illustrates schematically another exemplary network interface unit.
Figure 8:
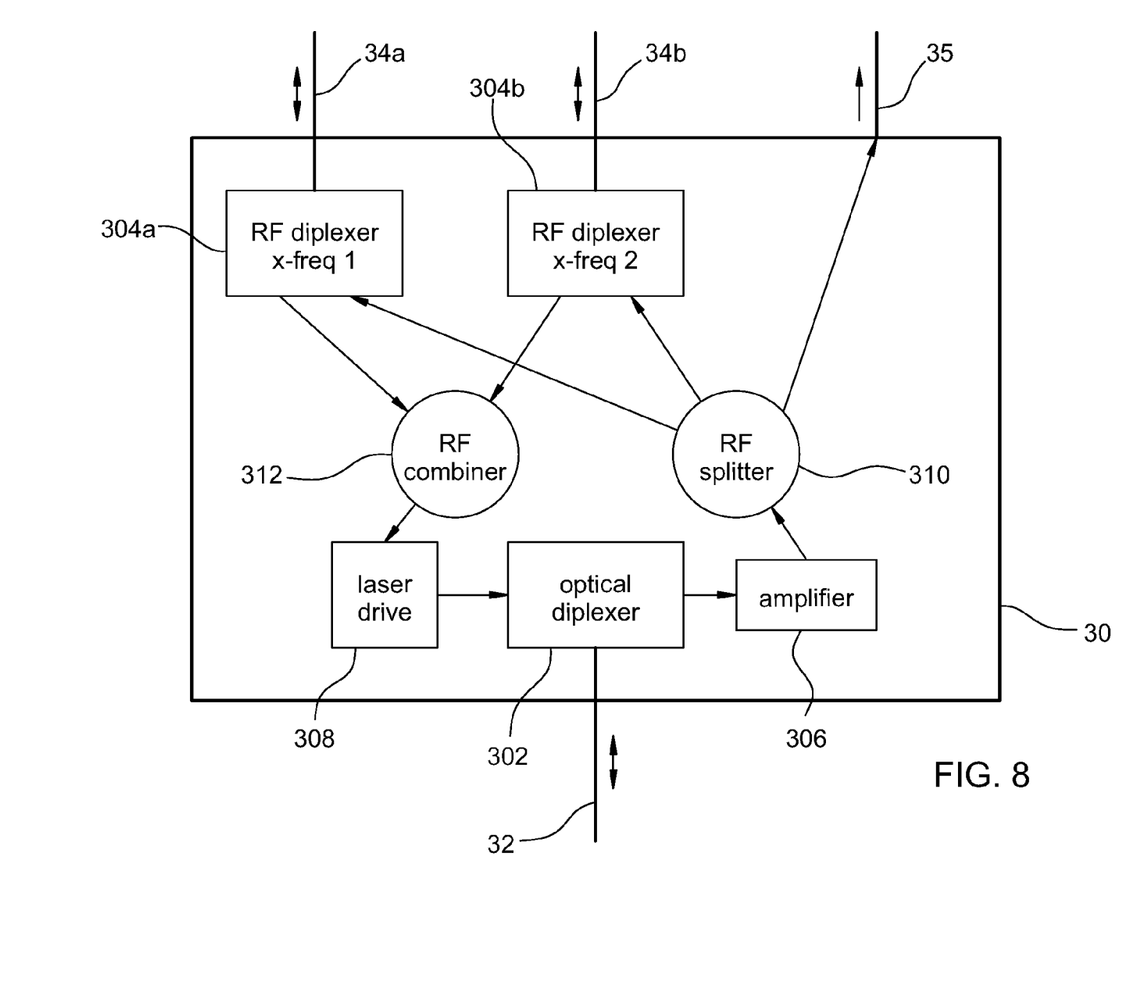
FIG. 8 illustrates schematically another exemplary network interface unit. The embodiments shown in the Figures are exemplary only, and should not be construed as limiting the scope of the present disclosure and/or appended claims.

In the exemplary embodiments of FIGS. 6, 7, and 8, one or more of the RF ports are output ports only, instead of being bidirectional. Such embodiments can be employed, for example, in situations in which one or more of the RF signal ports are only used only for downstream signals. One or more bidirectional ports with corresponding RF diplexers can be employed as described herein for simultaneous transmission of upstream and downstream signals.

In FIG. 6, NIU 30 comprises a bidirectional optical signal port 32 connected to optical diplexer 302, bidirectional RF signal port 34 connected to RF diplexer 304, and an RF output port 35 (unidirectional). The NIU 30 can further include an RF amplifier 306 of any suitable type or a laser drive circuit 308 of any suitable type. RF splitter 310 divides an RF signal 308 derived by the optical diplexer from an optical input signal, and transmits the resulting portions of the derived RF signal to the RF ports 34 and 35 as RF output signals. The RF output signal transmitted to RF port 34 is transmitted through RF diplexer 304. RF diplexer 304 transmits an RF output signal to RF port 34 only in a corresponding RF output frequency range. An RF input signal received at RF port 34 is transmitted, only in a corresponding RF input frequency range, through RF diplexer 34 to optical diplexer 302, where it modulates an optical output signal transmitted to optical port 32. The RF input and output frequency ranges are substantially determined by RF diplexer 304, as described above. In FIG. 7, the RF output signal is divided among multiple unidirectional RF output ports 35a and 35b. The RF input signal range of RF port 34 can overlap the RF output frequency range transmitted to unidirectional port 35 (FIG. 6) or 35a and 35b (FIG. 7).

In FIG. 8, the NIU 30 includes two bidirectional RF signal ports 34a and 34b connected to corresponding RF diplexers 304a and 304b. Input RF signals received at RF ports 34a and 34b and transmitted by RF diplexers 304a and 304b are combined by RF combiner 312. The combined RF signal is transmitted to optical diplexer 302 to modulate the optical output signal. As described above for previous exemplary embodiments, the upstream/downstream bandwidth allocations can differ between bidirectional output ports 34a and 34b, and either or both of those RF ports can have RF input frequency ranges that overlap the RF output frequency range of unidirectional RF port 35.

Independent upstream/downstream bandwidth allocation can be implemented in a hybrid telecommunications network using NIUs as illustrated in any of FIG. 1, 2, 3, 6, 7, or 8. A method comprises: (a) receiving from an optical network into a corresponding bidirectional optical port of each of the multiple network interface units the RF-modulated optical signal and deriving an RF signal therefrom; (b) transmitting a corresponding portion of the derived RF signal only in a corresponding output RF frequency range to a corresponding bidirectional RF signal port of each of the multiple network interface units; (c) receiving a corresponding RF signal into a corresponding bidirectional RF signal port of each of the multiple network interface units; and (d) transmitting the corresponding received RF signal only in a corresponding input RF frequency range to modulate a corresponding optical signal transmitted by each network interface unit through the corresponding bidirectional optical port to the optical network. At least one corresponding input RF frequency range at least partly overlaps at least one corresponding output RF frequency range.

In any of the exemplary embodiments, each bidirectional RF signal port and its corresponding RF diplexer can be configured to provide a desired partition of upstream and downstream signal bandwidth. For each bidirectional RF port, any suitable bandwidth allocation can be employed wherein RF input and output signals are not transmitted simultaneously at RF frequencies close enough to interfere with one another. While simple high or low pass RF diplexers are described in the exemplary embodiments, other more complex RF frequency partitions can be employed using suitable hardware. In some embodiments the upstream/downstream bandwidth allocation for a given bidirectional port can be a static property of that port's diplexer, or the bandwidth allocation can vary dynamically to enable different bandwidth allocations at different times. Such variation of the bandwidth allocation can be manual or automatic, prescheduled or in response to variations in demand for bandwidth, based on differing user fee levels, or determined or scheduled in any other suitable or desirable way. Bandwidth allocations can vary among multiple bidirectional RF signal ports of a single NIU, or among bidirectional RF signal ports of multiple NIUs on a common network.

Figure 4:
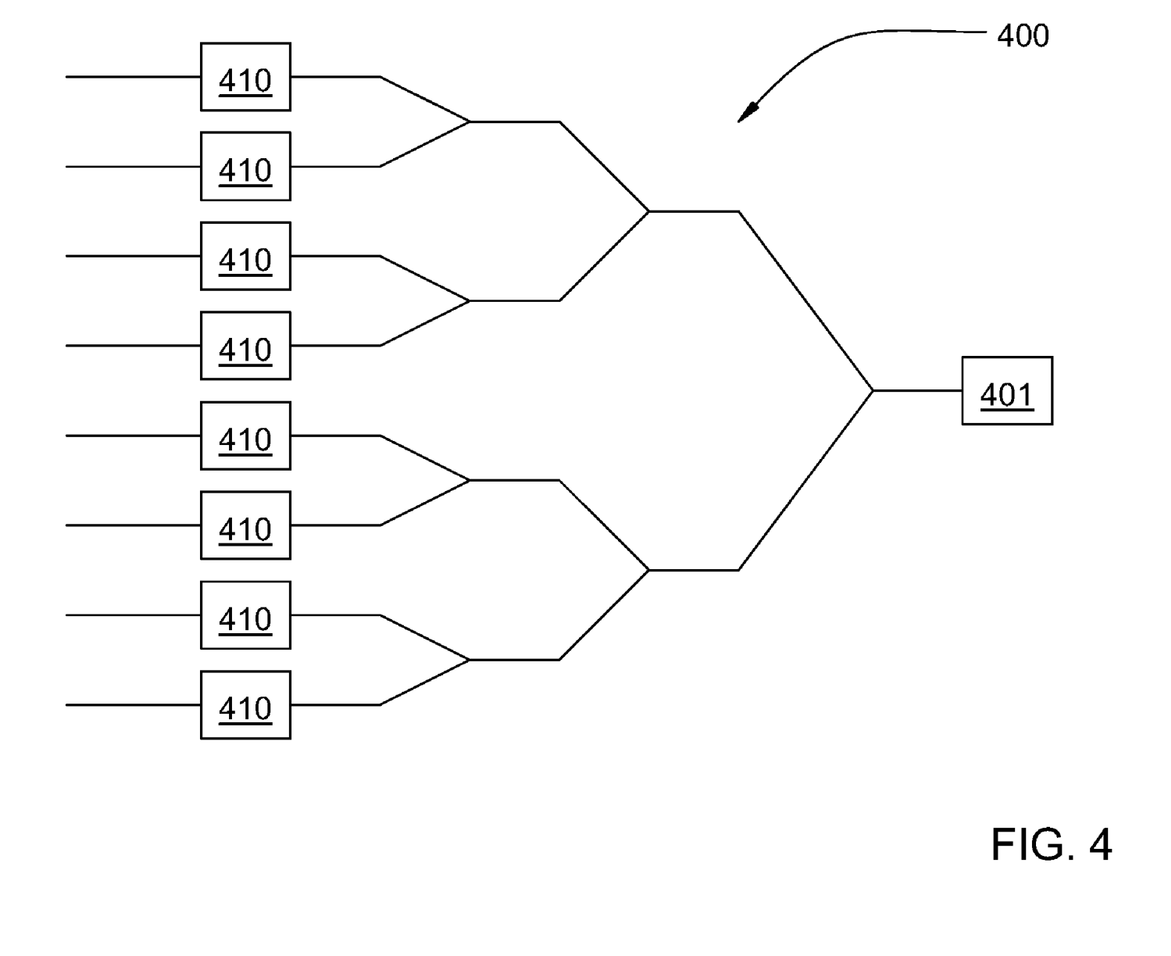
FIG. 4 illustrates schematically an exemplary hybrid telecommunications network.

One exemplary implementation of a hybrid network having multiple independent upstream/downstream bandwidth allocations is illustrated schematically in FIG. 4. An optical network 400 connects multiple NIUs 410 to a common network node 401. The multiple NIUs 410 are configured substantially as shown in FIG. 1, each having a corresponding input RF frequency range and a corresponding output RF frequency range. In prior hybrid networks, each NIU has the same upstream/downstream bandwidth allocation, i.e., each NIU has the same input RF frequency range and the same output RF frequency range as the others, and the common input and output RF frequency ranges are substantially non-overlapping. In the hybrid network of FIG. 4, the corresponding input RF frequency range of at least one of the multiple NIUs 410 at least partly overlaps the corresponding output RF frequency range of at least one other of the multiple NIUs 410. At least one of the multiple NIUs 410 in the hybrid network thus has an upstream/downstream bandwidth allocation differing from one or more of the other NIUs 410. Upstream and downstream bandwidth can be allocated independently for each NIU 410 independently of the others.

Figure 3:
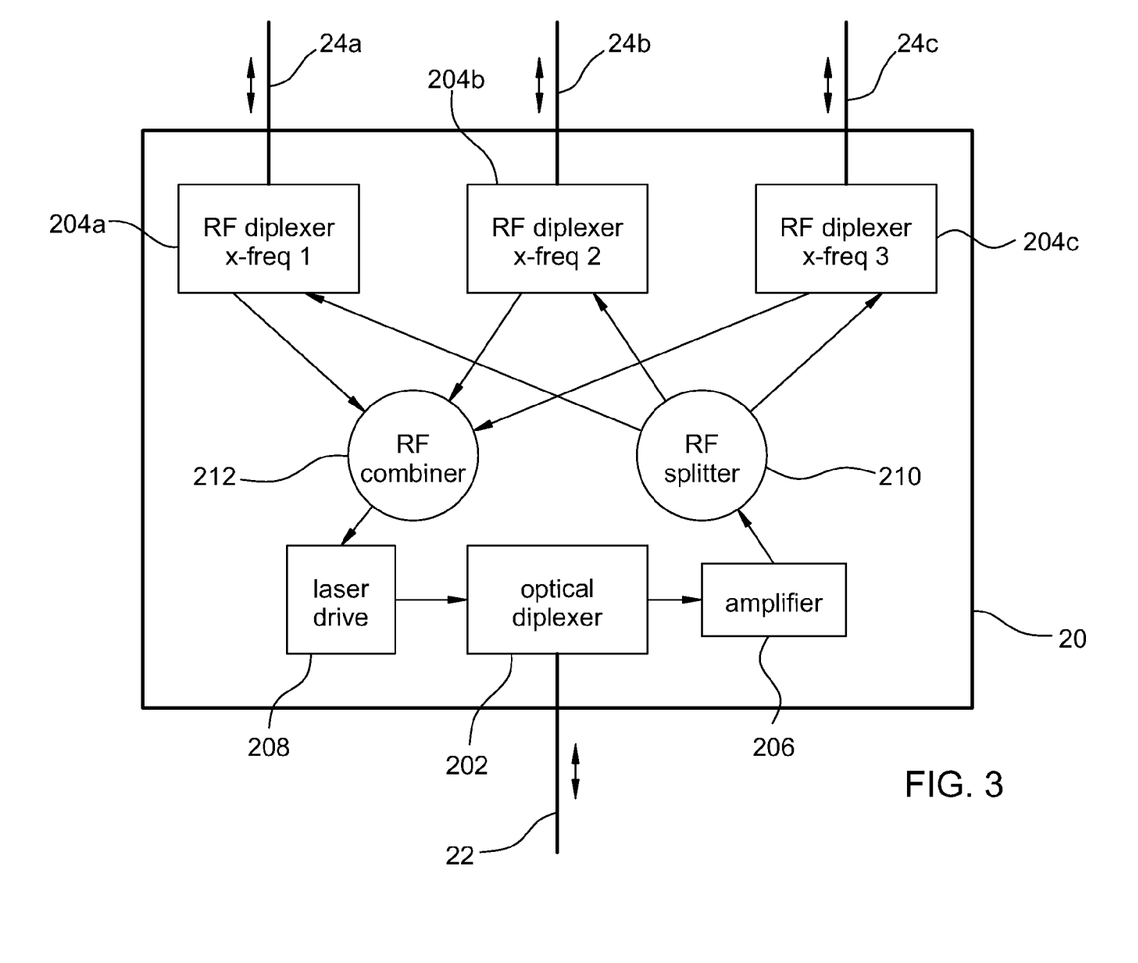
FIG. 3 illustrates schematically another exemplary network interface unit.
Figure 5:
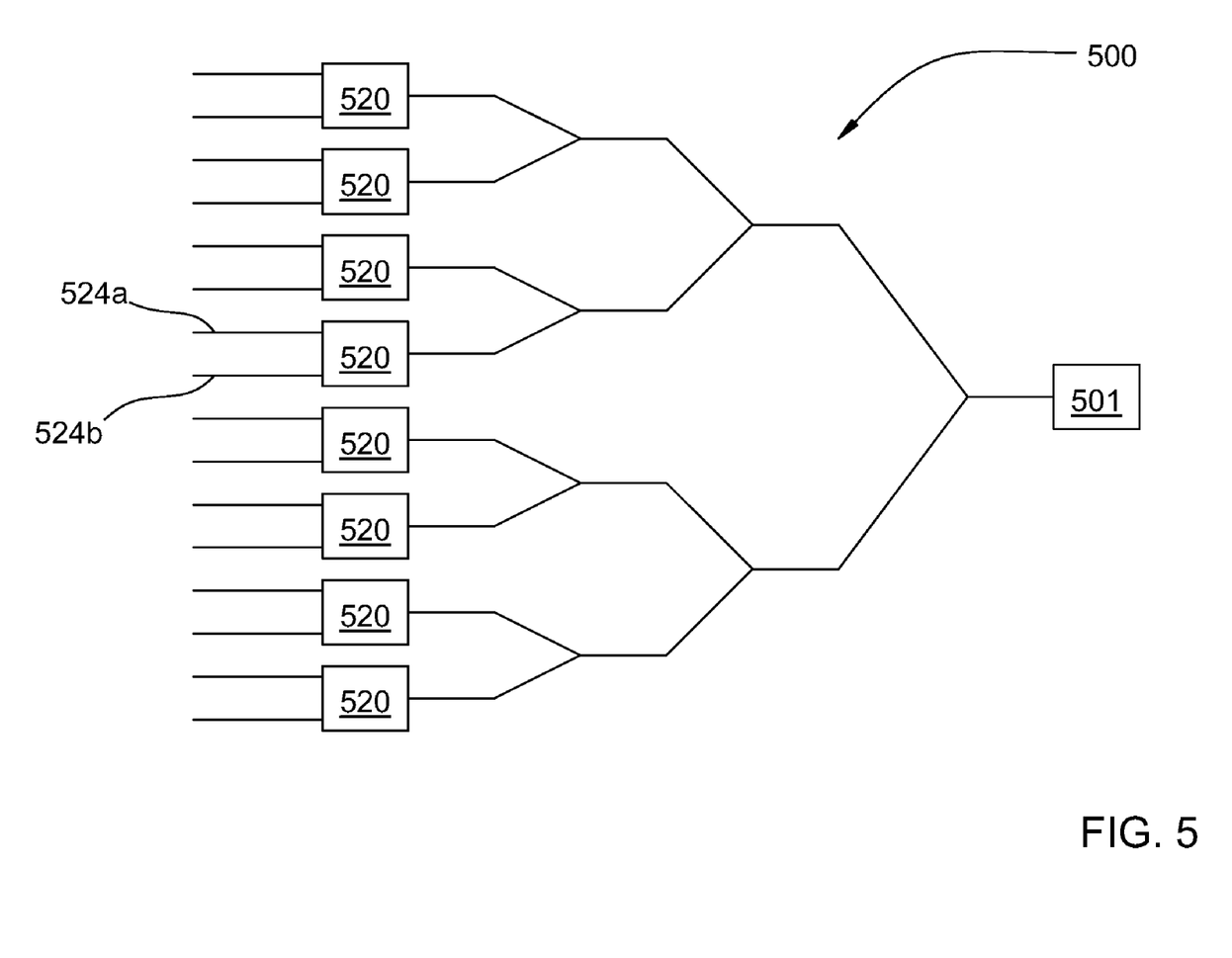
FIG. 5 illustrates schematically another exemplary hybrid telecommunications network.

Another exemplary implementation of a hybrid network having multiple independent upstream/downstream bandwidth allocations is illustrated schematically in FIG. 5. An optical network 500 connects multiple NIUs 520 to a common network node 501. At least one of the multiple NIUs 520 is configured substantially as shown in FIG. 2 or FIG. 3, with corresponding first and second input RF frequency ranges and corresponding first and second output RF frequency ranges. The first input and first output RF frequency ranges are substantially non-overlapping and the second input and second output RF frequency ranges are substantially non-overlapping. The first output RF frequency range at least partly overlaps the second input RF frequency range or the second output RF frequency range at least partly overlaps the first input RF frequency range. The NIU 520 thus configured has differing allocations of upstream and downstream bandwidth for its multiple corresponding RF signal ports 524a/524b. All of the NIUs 520 can be thus configured, each with multiple independent bandwidth allocations on its corresponding RF signal ports. All such NIUs can have the same set of independent bandwidth allocations, or upstream and downstream bandwidth can be allocated independently for each RF signal port of each NIU 520. In addition, a hybrid network can include a mixture of NIUs configured as shown in FIG. 1, as shown in FIG. 2, or as shown in FIG. 3.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. A network interface apparatus comprising:
(a) a bidirectional optical signal port;
(b) an optical diplexer connected to the bidirectional optical signal port;
(c) a first RF signal port;
(d) a second RF signal port;
(e) a first RF diplexer configured and connected to transmit a first received RF input signal from the first RF signal port to the optical diplexer to modulate an optical output signal transmitted by the optical diplexer to the optical signal port, the first RF signal port being a bidirectional RF signal port; and
(f) an RF splitter configured and connected (i) to receive from the optical diplexer an RF signal derived from an RF-modulated optical input signal received from the bidirectional optical signal port, (ii) to transmit a first portion of the derived RF signal as a first RF output signal to the first RF signal port through the first RF diplexer, and (iii) to transmit a second portion of the derived RF signal as a second RF output signal to the second RF signal port, (g) wherein the first RF diplexer is configured so that (i) the first RF input signal is transmitted through the first RF diplexer only in a first RF input frequency range, (ii) the first RF output signal is transmitted through the first RF diplexer only in a first RF output frequency range, (iii) the first RF input and the first RF output frequency ranges are substantially non-overlapping, and (iv) the first RF input frequency range overlaps a second RF output frequency range in which the second RF output signal is transmitted.

2. The apparatus of claim 1 further comprising at least one additional RF signal port, wherein the RF splitter is further configured and connected to transmit a corresponding additional portion of the derived RF signal as a corresponding additional RF output signal to the corresponding additional bidirectional RF signal port.

3. The apparatus of claim 1 further comprising:
a second RF diplexer configured and connected to transmit a second received RF input signal from the second RF signal port to the optical diplexer, the second RF signal port being a bidirectional RF signal port; and
an RF combiner configured and connected (i) to receive from each of the first and second RF signal ports through the corresponding first and second RF diplexers corresponding first and second RF input signals and (ii) to transmit the combined first and second received RF input signals to the optical diplexer to modulate the optical output signal,
wherein the first and second RF diplexers are configured so that (i) the second RF input signal is transmitted through the second RF diplexer only in a second RF input frequency range, (ii) the second RF output signal is transmitted through the second RF diplexer only in a second RF output frequency range, (iii) the second RF input and the second RF output frequency ranges are substantially non-overlapping, and (iv) the first RF input frequency range differs from the second RF input frequency range or the first RF output frequency range differs from the second RF output frequency range.

4. The apparatus of claim 3 further comprising at least one additional RF signal port, wherein the RF splitter is further configured and connected to transmit a corresponding additional portion of the derived RF signal as a corresponding RF output signal to the corresponding additional RF signal port.

5. The apparatus of claim 4 further comprising an additional RF diplexer configured and connected to transmit a corresponding additional received RF input signal from the corresponding additional RF signal port to the optical diplexer, the corresponding additional RF signal port being a bidirectional RF signal port,
wherein the RF combiner is further configured and connected (i) to receive from the corresponding additional bidirectional RF signal port through the corresponding additional RF diplexer the corresponding additional received RF input signal, and (ii) to transmit the combined first, second, and corresponding additional received RF input signals to the optical diplexer to modulate the optical output signal.

6. The apparatus of claim 3 wherein the first and second RF diplexers are configured so that (i) the first RF output frequency range at least partly overlaps the second RF input frequency range or (ii) the second RF output frequency range at least partly overlaps the first RF input frequency range.

7. The apparatus of claim 3 wherein the first and second RF diplexers are configured so that (i) the first RF input frequency range is lower than the first RF output frequency range, (ii) the second RF input frequency range is lower than the second RF output frequency range, and (iii) the first RF output frequency range overlaps the second RF input frequency range.

8. The apparatus of claim 7 wherein the first input RF frequency range is less than about 42 MHz and the first output RF frequency range is greater than about 54 MHz.

9. The apparatus of claim 7 wherein the first input RF frequency range is within the CATV return band and at least a portion of the second input RF frequency range is outside the CATV return band.

10. The apparatus of claim 1 further comprising (i) an RF amplifier configured and connected to amplify the derived RF signal or (ii) a laser drive circuit configured and connected to modulate, with the received RF input signal transmitted to the optical diplexer, a laser drive signal to modulate the transmitted optical signal.

11. The apparatus of claim 1 wherein the optical diplexer is configured to receive optical signals differing in wavelength from optical signals it transmits.

12. A method comprising:
(a) receiving into an RF splitter from an optical diplexer an RF signal derived from an RF-modulated optical signal received by the optical diplexer from a bidirectional optical signal port;
(b) transmitting from the RF splitter (i) a first portion of the derived RF signal to a first RF signal port as a first RF output signal through a corresponding first RF diplexer, and (ii) a second portion of the derived RF signal as a second RF output signal to a second RF signal port;
(c) receiving a first RF input signal from the first RF signal port through the first RF diplexer, the first RF signal port being a bidirectional RF signal port; and
(d) transmitting the first received RF input signal to the optical diplexer to modulate an optical output signal transmitted by the optical diplexer to the optical signal port,
(e) wherein (i) the first RF input signal is transmitted through the first RF diplexer only in a first RF input frequency range, (ii) the first RF output signal is transmitted through the first RF diplexer only in a first RF output frequency range, (iii) the first RF input and the first RF output frequency ranges are substantially non-overlapping, and (iv) the second RF output signal is transmitted only in a second RF output frequency range, and (v) the first RF input frequency range overlaps the second RF output frequency range.

13. The method of claim 12 further comprising transmitting from the RF splitter a corresponding additional portion of the derived RF signal as a corresponding additional RF output signal to the corresponding additional bidirectional RF signal port.

14. The method of claim 12 further comprising:
receiving a second RF input signal from the second RF signal port through a second RF diplexer, the second RF signal port being a bidirectional RF signal port;
receiving into an RF combiner the first and second RF input signals from each of the first and second RF signal ports through the corresponding first and second RF diplexers; and
transmitting the combined first and second received RF input signals to the optical diplexer to modulate the optical output signal, wherein (i) the second RF input signal is transmitted through the second RF diplexer only in a second RF input frequency range, (ii) the second RF output signal is transmitted through the second RF diplexer only in a second RF output frequency range, (iii) the second RF input and the second RF output frequency ranges are substantially non-overlapping, and (iv) the first RF input frequency range differs from the second RF input frequency range or the first RF output frequency range differs from the second RF output frequency range.

15. The method of claim 14 further comprising transmitting from the RF splitter at least one additional portion of the derived RF signal as a corresponding RF output signal to a corresponding additional RF signal port.

16. The method of claim 15 further comprising:
receiving at least one additional RF input signal from the corresponding additional RF signal port through an additional corresponding second RF diplexer, the additional RF signal port being a bidirectional RF signal port;
receiving into an RF combiner the additional RF input signal from the corresponding additional RF signal port through the corresponding additional RF diplexer; and
transmitting the combined first, second, and additional received RF input signals to the optical diplexer to modulate the optical output signal.

17. The method of claim 14 wherein (i) the first RF output frequency range at least partly overlaps the second RF input frequency range or (ii) the second RF output frequency range at least partly overlaps the first RF input frequency range.

18. The method of claim 14 wherein (i) the first RF input frequency range is lower than the first RF output frequency range, (ii) the second RF input frequency range is lower than the second RF output frequency range, and (iii) the first RF output frequency range overlaps the second RF input frequency range.

19. The method of claim 18 wherein the first input RF frequency range is less than about 42 MHz and the first output RF frequency range is greater than about 54 MHz.

20. The method of claim 18 wherein the first input RF frequency range is within the CATV return band and at least a portion of the second input RF frequency range is outside the CATV return band.

21. The method of claim 12 further comprising (i) amplifying the derived RF signal prior to receiving it into the RF splitter, or (ii) modulating, with the received RF input signal transmitted to the optical diplexer, a laser drive signal to modulate the transmitted optical signal.

22. The method of claim 12 wherein the wavelength of the received optical signal differs from the wavelength of the transmitted optical signal.

23. A method comprising:
(a) receiving from an optical network into a corresponding bidirectional optical port of each of the multiple network interface units the RF-modulated optical signal and deriving an RF signal therefrom;
(b) transmitting a corresponding portion of the derived RF signal only in a corresponding output RF frequency range to a corresponding bidirectional RF signal port of each of the multiple network interface units;
(c) receiving a corresponding RF signal into a corresponding bidirectional RF signal port of each of the multiple network interface units; and
(d) transmitting the corresponding received RF signal only in a corresponding input RF frequency range to modulate a corresponding optical signal transmitted by each network interface unit through the corresponding bidirectional optical port to the optical network,
wherein at least one corresponding input RF frequency range at least partly overlaps at least one corresponding output RF frequency range.

24. The method of claim 23 wherein corresponding input and output RF frequency ranges of a least one of the multiple network interface units at least partly overlap.

25. The method of claim 24 wherein:
at least one of the multiple network interface units comprises at least two bidirectional RF signal ports, each of the at least two bidirectional RF signal ports transmitting corresponding first and second portions of the derived RF signal only in corresponding first and second output RF frequency ranges, each of the at least two bidirectional RF signal ports transmitting corresponding first and second received RF signals only in corresponding first and second input RF frequency ranges to modulate the corresponding transmitted optical signal;
the first input and first output RF frequency ranges are substantially non-overlapping and the second input and second output RF frequency ranges are substantially non-overlapping; and
the first output RF frequency range at least partly overlaps the second input RF frequency range or the second output RF frequency range at least partly overlaps the first input RF frequency range.

26. The method of claim 23 wherein the corresponding input RF frequency range of at least one of the multiple network interface units at least partly overlaps the corresponding output RF frequency range of at least one other of the multiple network interface units.

* * * * *